Oct. 25, 1927.
T. C. McKINLEY
1,646,488
PROCESS FOR FORMING SHEET GLASS
Filed Jan. 18, 1926
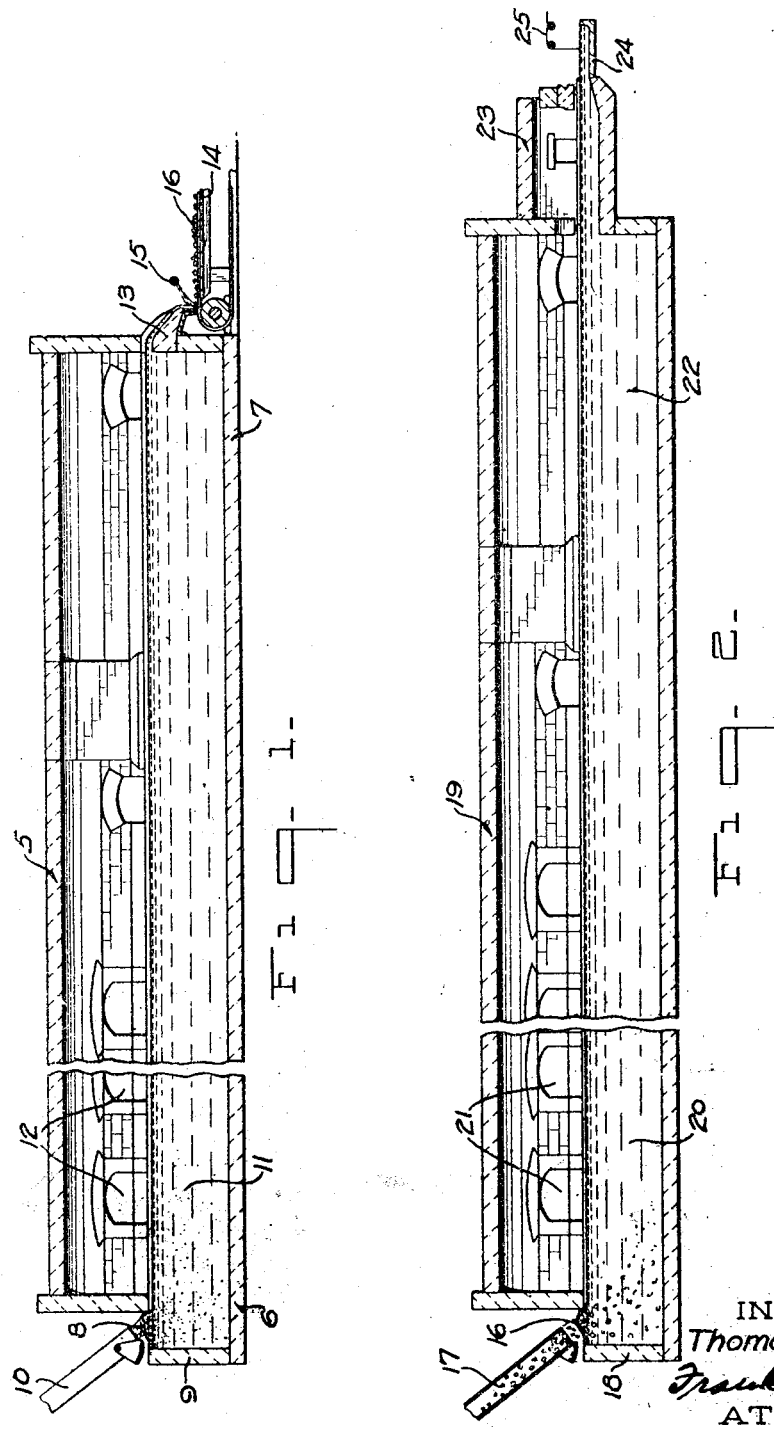
INVENTOR
Thomas C. McKinley
Frank Fraser
ATTORNEY Patented Oct. 25, 1927.

1,646,488

UNITED STATES PATENT OFFICE.

THOMAS C. McKINLEY, OF CHARLESTON, WEST VIRGINIA, ASSIGNOR TO LIBBEY-OWENS SHEET GLASS COMPANY, OF TOLEDO, OHIO, A CORPORATION OF OHIO.

PROCESS FOR FORMING SHEET GLASS.

Application filed January 18, 1926. Serial No. 81,925.

The present invention relates to a process for producing glass articles.

An important object of the invention is to provide a process wherein glass articles are formed from a source of supply made from cullet.

A further object of the invention is to provide a process wherein a glass batch is melted and permitted to solidify, after which this solidified glass is remelted to form a source of supply which may be refined and used to produce the desired articles.

Still another object of the invention is to provide a process, particularly well adapted for the production of flat drawn sheet glass, and more specifically includes means for forming cullet, said cullet being remelted to form a mass of molten glass from which the sheet may be drawn, this latter mass of glass being formed from cullet only, and preferably cullet from the same batch.

Other objects and advantages of the invention will become apparent during the course of the following description.

In the drawings wherein like numerals are employed to designate like parts throughout the same, Fig. 1 is a vertical longitudinal section of a form of cullet producing apparatus which may be used, and Fig. 2 is a vertical longitudinal section of a form of sheet glass apparatus.

It is common practice in the prior art to produce a source of molten glass by melting a batch which includes some raw materials and some cullet. In the various processes the percentage of cullet varies.

In the drawings, especially in Fig. 2, a type of furnace and tank which has been used in connection with the Colburn machine is illustrated. In preparing glass for the Colburn machine it has been found that the quality of glass can be improved after it has started to run bad by adding a slightly higher percentage of cullet than originally. It has also been found that cullet which is not foreign cullet gives the most beneficial results.

In the Colburn machine the glass batch is introduced at one end of a tank furnace, where it is subjected to an intense heat to melt the ingredients of said batch. The molten glass thus formed is permitted to flow through the refining end of the tank, after which it passes through a cooling chamber and into the pot from which the glass is drawn in sheet form. Some of the glass is skimmed off of the molten mass before it is drawn into the sheet, and this skimmed glass is ordinarily subjected to the action of cold water which transforms the molten glass into cullet. In addition to the cullet formed in this manner, considerable glass is trimmed off from the sheet and this is also known as cullet. Cullet used in the batch, which was originally produced from the same tank, is much better than cullet taken from some other tank not using the same batch makeup.

In the present application a process is set forth wherein nothing but cullet is used to create a mass of molten glass from which the sheet may be drawn.

In Fig. 1 a form of tank furnace 5 is shown wherein the end 6 is the melting end, and the end 7 is the refining end. The raw materials or batch 8 is introduced within the dog-house 9 by means of a spout 10. The batch 8 floats upon the molten glass 11. and is subjected to heat introduced through the regenerators 12. The molten glass then flows through the refining end and is permitted to overflow a lip 13 upon an endless conveyor 14. A jet of cold water 15 is brought to play upon the hot glass as it overflows the lip, which causes the glass to become solidified and broken up into cullet 16. It is to be clearly understood that the arrangement shown in Fig. 1 is purely diagrammatic, as any form of tank can be used to produce the cullet.

The cullet 16 is then placed in a suitable receptacle having connection with a spout 17, so that at intervals the cullet 16 may be discharged in the dog-house end 18 of the tank furnace 19. The cullet 16 floats upon the molten glass 20 in the furnace 19 where it is again subjected to the action of regenerators 21. The molten mass then flows through the refining end 22, cooling chamber 23, and out into the draw-pot 24, from which a sheet 25 may be continuously drawn.

By using this process, the amount of dust and dirt, which has heretofore been prevalent in the glass tank, is practically entirely eliminated. The various ingredients used in the batch 8 in Fig. 1 are easily blown about as they are chiefly in powder form. On the other hand the cullet 16 is nothing more than pieces of broken glass which is easily melted. The glass entering the draw-pot 24, when formed from cullet, is of a better nature than the glass overflowing the lip 13 in Fig. 1, thus permitting a wider sheet to be drawn at a faster rate than heretofore. It is believed that all of the ordinary troubles encountered in the machines using molten glass formed by the usual practice will be greatly reduced.

By using cullet to form the mass of molten glass from which the sheet is drawn, it is possible to obtain uniform melting conditions and to hold such conditions. In the operation of the Colburn machine as now used, when defects turn up in the sheet, it is customary to make various changes all along the line down to and including the melting end to overcome the troubles with the sheet being drawn. These variations, although necessary at the time to improve the sheet, are not beneficial to the glass being melted. As the cullet is remarkably constant in its nature as regards melting conditions, it will rarely be necessary to vary the melting end to take care of variations in the drawing machine operation.

In addition to the possibilities of uniform melting conditions, it is to be noted that the action of the batch ordinarily used is very corrosive on the tank blocks during the melting, which necessitates shut-downs for cold repairs at relatively frequent intervals. On the other hand, in remelting cullet, the corrosive action is much less and the tank furnace, from which the sheet source is supplied, will have a much longer life than when the raw batch is melted as at present. In view of these advantages, it is not necessary to interrupt production of the sheet glass as often as has been customary. Occasionally, due to either imperfect melting conditions or mixtures in batch composition, defective glass is produced, and in such a case when cullet is being produced, this matter can be caught and the bad cullet returned to the tank for remelting after the conditions which caused the formation of poor cullet has been corrected. Of course it is to be understood that suitable connections can be had between the cullet producing machine and the tank furnace which remelts the cullet, that is, the glass can flow from the first melting tank directly into the tank furnace without being entirely chilled, thus saving to a certain extent the amount of fuel required in the remelting. The invention consists in the idea of using cullet for the purpose of forming molten glass from which a sheet may be drawn.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. That step in the process of producing a glass article, consisting in forming a molten source of supply from cullet only.

2. The process of producing a glass article, consisting in assembling a raw batch of materials, melting the batch, causing the molten glass by the act of cooling to solidify in particle form, and then remelting the same to form a molten source of supply from which the article may be made.

3. The process of producing sheet glass, consisting in melting cullet only to form a mass of molten glass, refining the same, and then forming a sheet from said molten glass.

4. The process of producing sheet glass, consisting in melting cullet only to form a mass of molten glass, and then drawing a sheet therefrom.

5. The process of producing sheet glass, consisting in melting a raw batch of materials to form molten glass, permitting the glass to become hardened in particle form, and then using this hardened particle glass to form a mass of molten glass from which the sheet may be drawn.

6. As a new article of manufacture, a sheet of glass made from remelted cullet only.

7. The process of producing a glass article consisting in melting a row batch of materials to form molten glass, cooling said glass whereby to cause it to solidify in particle form, and then forming a molten source of supply from these solidified particles only.

Signed at Toledo, in the county of Lucas, and State of Ohio, this 14th day of January, 1926.

THOMAS C. McKINLEY.